United States Patent Office 3,309,772
Patented Mar. 21, 1967

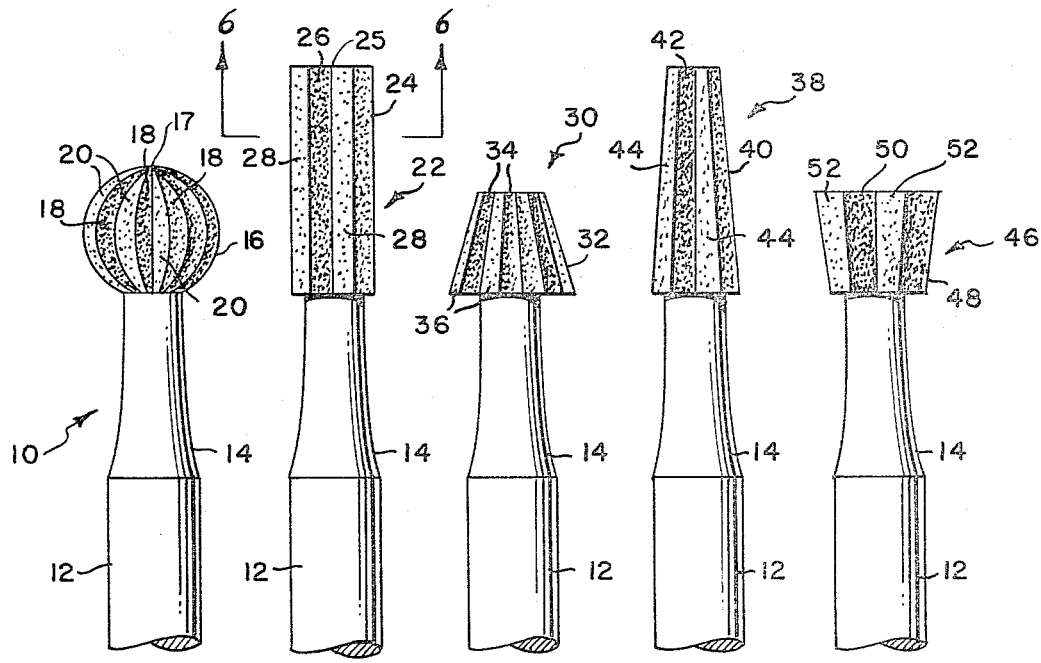
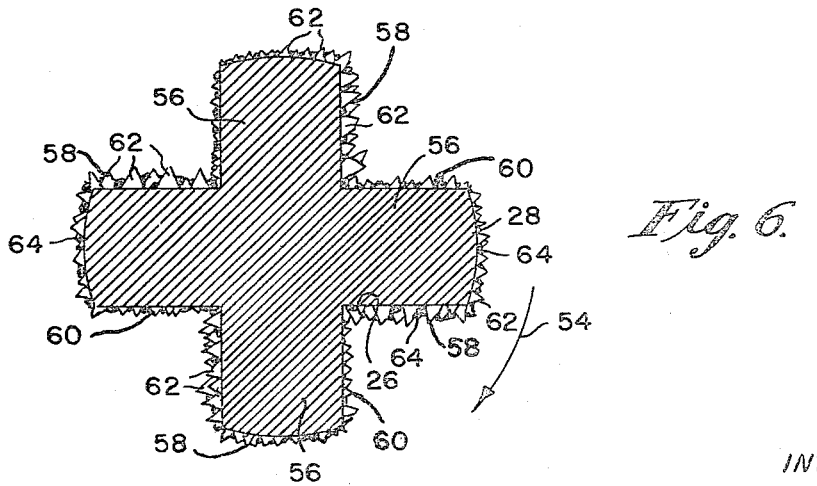
INVENTORS.
NATHANIEL H. LIEB
HARVEY E. ROSENBLUTH
ANTHONY J. TURCHI
BY
Caesar and Rivise
ATTORNEYS.

3,309,772
COMBINATION BLADED BUR DIAMOND DRILL
Nathaniel H. Lieb and Harvey E. Rosenbluth, Philadelphia, and Anthony J. Turchi, Bala Cynwyd, Pa., assignors to Star Dental Manufacturing Co., Inc. (also known as Star Dental Manufacturing Company, Inc., and Star Dental Mfg. Co., Inc.), a corporation of Delaware
Filed June 18, 1964, Ser. No. 376,018
7 Claims. (Cl. 32—48)

This invention relates to a bur used for dental handpieces, and more particularly, relates to a bladed bur having the cutting surface thereof coated with diamonds.

Diamonds are well known in the dental industry for use on dental burs. However, until the present invention, diamonds were used solely on continuous surface grinding devices. Thus the diamonds were used on such shapes as cylinders, balls and frustums. Also, until this invention, all milling and cutting work was generally done with bladed burs having a carbide or similar coating on the blades.

The dental bur of this invention comprises a bladed bur coated with dimaonds. The bur of this invention gives far superior results to those obtainable with either the carbide on the bladed bur or the diamonds on the continuous surface bur of the prior art.

It is therefore an object of this invention to provide a novel dental bur.

It is another object of this invention to provide a diamond coated bladed bur that is superior in performance to either the carbide or diamond burs of the prior art.

It is further object of this invention to provide a novel dental bur which has a cutting speed which is greater than the cutting speed of the prior art dental burs.

It is a further object of this invention to provide a novel dental bur having an increased efficiency for removing amalgam.

It is a further object of this invention to provide a dental bur that causes less crazing of enamel than that caused by the use of carbide burs.

These and other objects of this invention are accomplished by providing a dental bur comprising a shank and a head, said head having a plurality of grooves cut therein, each groove forming a leading blade surface and a trailing blade surface within said head, with each leading blade surface having diamonds bonded thereto, said head having land areas between said grooves, with said land areas also having diamonds bonded thereto.

Other objects and many of the attendant advantages of this invention will be readily appreciated as the same becomes better understood by reference to the following detailed description when considered in connection with the accompanying drawings wherein:

FIG. 1 is a front elevational view of one embodiment of the dental bur of this invention;

FIG. 2 is a front elevational view of a second embodiment of the dental bur of this invention;

FIG. 3 is a front elevational view of a third embodiment of the dental bur of this invention;

FIG. 4 is a front elevational view of a fourth embodiment of the dental bur of this invention;

FIG. 5 is a front elevational view of a fifth embodiment of the dental bur of this invention; and FIG. 6 is an enlarged sectional view taken along the line 6—6 of FIG. 2.

Referring now in greater detail to the various figures of the drawings wherein similar reference characters refer to similar parts, a combination bladed bur diamond drill embodying the present invention is generally shown at 10 in FIG. 1. Device 10 basically comprises a shank 12 having a tapering neck 14 and a cutting head 16 having a tip 17. Cutting head 16 is spherical and includes a plurality of equally spaced longitudinal grooves 18. Positioned between the grooves are land areas 20. The land areas comprise the circumferential surface of the head remaining after the grooves have been cut into the head. The formation of the grooves provides the dental bur with a bladed head.

A second embodiment of the dental bur of this invention is generally shown at 22 in FIG. 2. This embodiment also includes the conventional shank 12 and tapered neck 14. In this embodiment, head 24 comprises a cylinder having a tip 25. Longitudinal grooves 26 are formed in the head leaving land areas 28.

A third embodiment of the dental bur of this invention is generally shown at 30 in FIG. 3. In this embodiment, head 32 has a short frustum shape. Again, the head is provided with a plurality of longitudinal grooves 34 leaving land areas 36.

A fourth embodiment of the dental bur of this invention is generally shown at 38 in FIG. 4. In this embodiment, head 40 comprises an elongated frustum. Head 40 is provided with a plurality of longitudinal grooves 42 leaving land areas 44.

A fifth embodiment of the dental bur of this invention is generally shown at 46 in FIG. 5. In this embodiment, head 48 comprises a short frustum with the base of the frustum being uppermost. Again, the head is provided with longitudinal grooves 50 leaving land areas 52.

The five different examples of heads that can be used are merely exemplary of the many sizes and shapes of heads of dental burs that can be adapted to the teachings of this invention. The feature that all of these dental burs have in common is that the grooves are provided in the heads, thereby leaving land areas between the grooves. As will be explained hereinafter, the leading surface of each groove must be coated with diamond particles and the land areas of the blade must be coated with diamond particles.

The leading surface of a groove is that surface which would contact a tooth when the dental bur is rotated in a dental handpiece. Thus, as seen in FIG. 6, the dental bur is to be rotated in the direction of arrow 54. The grooves in the head 22 of the dental bur divide the head into four equally spaced blades 56. The leading blade surface formed by groove 26 is shown at 58 and the trailing blade surface formed by the groove is shown at 60.

It is further seen in FIG. 6 that diamond particles 62 are adhered to all of the surfaces of blades 56 by a bonding metal 64.

The diamonds can be secured to the bladed dental bur by any of the methods well known to the art. Some of these methods are described in detail in United States Patent No. 2,020,117 and United States Patent No. 2,562,587. By way of example, the diamond particles, which may be chips or dust, are first coated with a thin film of conductive material such as silver. Thereafter they are coated with a magnetic metal, such as nickel, by placing them in a plating container constituting the cathode of a plating cell having a nickel anode and placing current on the cell.

The nickel coated diamond particles are then applied to and distributed over the head of a dental bur having the bladed structure referred to above. The particles are held in place by magnetic attraction, since the dental bur is made of a magnetic material and can be magnetized. With the particles thus held in place, they are permanently secured to the head of the bur by electrodepositing a layer of suitable metal onto the head and on or about the particles. By way of example, this metal can be nickel, although any of the other bonding metals known to the are such as cadmium, iron, cobalt, zinc, and alloys thereof may also be used. This method of securing the diamond particles is described in greater detail in aforementioned United States Patent No. 2,020,117.

The exact method by which the diamond particles are held in place forms no part of this invention. Thus, as previously pointed out, any of the well known bonding methods can be used. The critical part of the invention is, however, that the leading blade surface of each groove and the land areas be coated with diamonds. In FIG. 6 it is seen that the diamond particles cover all of the lateral surfaces of the bur. Although it is not necessarily required that all surfaces be covered, it has been found to be less expensive to coat all of the lateral surfaces than to attempt to coat merely the leading blade surface and the land areas of each blade of the bur. Additionally, by coating all of the lateral surfaces, the trailing blade surface could be used as a leading surface if the direction of rotation of the bur is reversed.

The ratio of land area to groove area, as measured by the total circumference of the head of the bur can vary from 30% land area to 70% land area. When less than 30% land area is used or more than 70% land area is used, the cutting speed is diminished. The maximum cutting speed can be obtained by using approximately 50% land area. One of the major distinctions between the dental bur of this invention and the prior art bladed burs coated with carbide is that the blades of the carbide burs comprised only edges, with substantially no land area. One of the unexpected properties of the dental bur of this invention is that even though it contains substantial land area, it still performs all of the functions of the prior art carbide bladed burs. In fact, many of these functions are performed with greater efficacy as compared with the prior burs.

The combination of the bladed surface and the land area permits the dental bur of this invention to be used as both a cutting and a grinding bur. The diamonds on the land area grind the tooth to be treated, and additionally create clearance for the leading bladed surface of the bur.

It has thus been found that the bur of this invention possesses many advantages over the prior art burs. It cuts deeper and faster than either the bladed carbide bur or the unbladed diamond bur of the prior art. Additionally, it lasts far longer than the carbide burs of the same configuration. Amalgam is more easily removed by the bladed diamond bur of this invention than the unbladed diamond bur of the prior art. Amalgam is also more easily removed by the bur of this invention than by the previous bladed carbide burs since no amalgam will fly. This is because the diamonds disintegrate the amalgam more finely than the carbide did. Another advantage of the bur of this invention over the prior art diamond burs is that the former are free of clogging whereas the latter are not. The grooves aid in carrying away any cut material.

Other advantages of the diamond bladed bur of this invention over the carbide bladed bur of the prior art are that the cavity walls prepared by the diamond bladed bur have a smoother finish and there is less crazing of the enamel than with the carbide bur.

The major portion of the diamonds used on the burs of this invention have a grit size varying from 80 to 150 mesh. The dental burs are of a size generally used in the art and have heads which vary in diameter from 0.035 to 0.080 inch. However, the teachings of this invention can also be applied to heads which are discs and have diameters which can be as large as 0.250 inch. The bladed burs can be made of any materials known in the art, such as stainless steel.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A dental bur comprising a shank and a head having a tip, said head having a plurality of grooves cut therein, said grooves extending to said tip, said grooves dividing said head into a plurality of blades, with each blade having a leading blade surface and a trailing blade surface within said head, with each leading blade surface having diamonds bonded thereto, said head having land areas between said grooves, with said land areas also having diamonds bonded thereto, whereby said bur is adapted to be used for cutting and grinding operations.

2. The dental bur of claim 1 wherein said diamonds are bonded to said head by a metal.

3. The dental bur of claim 2 wherein said metal is nickel.

4. The dental bur of claim 1 wherein said land area comprises between 30% and 70% of the circumference of said head.

5. The dental bur of claim 4 wherein said land area comprises approximately 50% of the circumference of said head.

6. The dental bur of claim 1 wherein said head has a diameter between approximately 0.035 and 0.080 inch.

7. The dental bur of claim 1 wherein said diamonds are particulate and a major portion of said diamonds have a grit size ranging from 80 to 150 mesh.

References Cited by the Examiner

UNITED STATES PATENTS

| | | | |
|---|---|---|---|
| 2,049,874 | 8/1936 | Sherk | 51—206 |
| 2,562,587 | 7/1951 | Swearingen | 51—309 |
| 2,730,848 | 1/1956 | Wallace et al. | 51—204 |

FOREIGN PATENTS 916,197  1/1963  Great Britain.

ROBERT E. MORGAN, *Acting Primary Examiner.*

RICHARD A. GAUDET, *Examiner.*

J. W. HINEY, *Assistant Examiner.*